25560
May 21, 1963     R. T. GIFFORD     3,090,108
METHOD OF MAKING A RIGID RESILIENT TIPPED NEEDLE VALVE ELEMENT
Original Filed Dec. 16, 1960
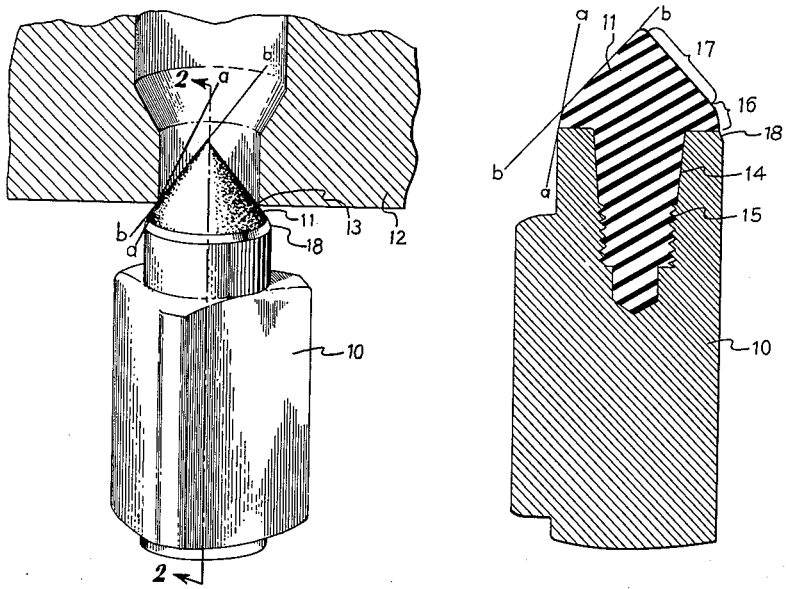
FIG. 1.     FIG. 2.
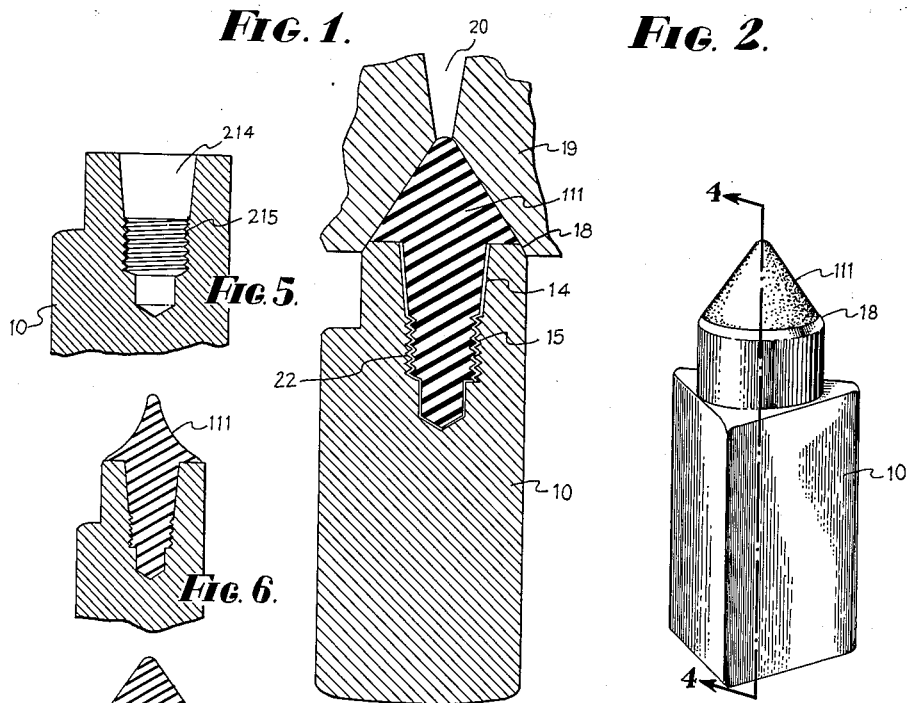
FIG. 5.     FIG. 4.     FIG. 3.
FIG. 6.
FIG. 7.
INVENTOR.
ROBERT T. GIFFORD,
BY
ATTORNEYS.

United States Patent Office 3,090,108
Patented May 21, 1963

3,090,108
METHOD OF MAKING A RIGID RESILIENT TIPPED NEEDLE VALVE ELEMENT
Robert T. Gifford, Yellow Springs, Ohio, assignor to Vernay Laboratories, Inc., Yellow Springs, Ohio, a corporation of Ohio
Original application Dec. 16, 1960, Ser. No. 76,359. Divided and this application Dec. 19, 1962, Ser. No. 245,718
6 Claims. (Cl. 29—156.7)

This is a division of the copending application in the name of the same inventor, Serial No. 76,359, filed December 16, 1960, and entitled Rubber Tipped Needle Valve and Method of Manufacturing the Same.

This invention relates to a rubber tipped needle valve and to a method of manufacturing such needle valve. The valve of the present invention may be used in any application where needle valves are generally used and particularly it may be used in connection with carburetors of conventional reciprocating engines. Rubber tipped needle valves have been known and used in the past but some difficulties have been encountered in the use of these valves due to distortion of rubber in molding as well as the difficulties in bonding the rubber tip to the metallic body of the valve element.

With the foregoing considerations in mind, it is an object of the present invention to provide a rubber tipped needle valve which provides for better seating of the tip in the valve seat, which provides a method of molding the tip, which prevents deformation or distortion of the rubber tip and which eliminates a flash between the rubber tip and the metallic needle body, whereby manufacturing cost is reduced.

These and other objects of the invention which will be described in more detail hereinafter, I accomplish by that construction and arrangement of parts and by that series of method steps of which I shall now disclose an exemplary embodiment.

Reference is made to the drawing forming a part hereof and in which:

FIGURE 1 is a perspective view of a typical needle valve having a rubber tip according to the present invention, showing the valve in engagement with a seat.

FIGURE 2 is a cross-sectional view of the same taken on the line 2—2 of FIGURE 1 on a somewhat enlarged scale.

FIGURE 3 is a perspective view of another embodiment.

FIGURE 4 is a cross-sectional view of the same on the line 4—4 of FIGURE 3 on an enlarged scale.

FIGURE 5 is a fragmentary cross-sectional view through the metallic body member before molding the rubber tip in place.

FIGURE 6 is a view similar to FIGURE 5 showing what happens when a certain configuration of tip is molded into the socket of FIGURE 5.

FIGURE 7 is a view similar to FIGURE 6 showing another embodiment of the invention.

Briefly, in the practice of the invention, I provide a metallic needle valve body of conventional configuration and having a socket provided with internal threads. In molding the rubber tip into the socket, the periphery of the socket is swaged slightly in the molding operation so that none of the rubber being injected into the mold can escape and form a flash which would have to be removed at a subsequent stage in the manufacture. According to one embodiment of the invention, the tip is provided with a convex profile which may either be a curve or it may comprise two conical portions having different apex angles as will be described in more detail hereinafter. In another embodiment wherein the tip is simply conical, distortion of the conical tip is prevented by other steps in the manufacture.

Referring now in greater detail to the drawings, in FIGURE 1 there is shown a needle valve element having the metallic body 10 and the rubber tip indicated generally at 11. 12 indicates an element having a valve seat 13 with which the tip 11 makes contact.

As best seen in FIGURE 2, the metallic body is provided with a hole 14 having the internal threads 15. The hole 14 may be slightly tapered at its mouth, as shown. In the embodiment of FIGURES 1 and 2, it will be seen that the tip has a portion at the base and indicated by the bracket 16 which is conical and has a relatively small apex angle as indicated by the line $aa$. Beyond the portion 16 is a portion 17 which is of greater vertical extent and which has a wider apex angle indicated at $bb$. The portions 16 and 17 merge into each other in a smooth curve.

The effect of this double angled configuration is to increase the space between the valve seat 13 and the upper end of the metallic needle body 18. Major distortion due to thermal shrinkage of rubber occurs near the base of the rubber tipped cone. If the valve seat diameter approaches that needle tip diameter where major distortion tends to occur, the resulting sealing performance is less satisfactory than it would be if the valve seat diameter were smaller and sealing occurred above the rubber tip diameter where major shrinkage distortion occurs. Therefore, with a constant tip base diameter, the double angle configuration locates the seat diameter farther from the major distortion area. In a double angle construction, more resilient rubber material is provided between a given needle body shank diameter and a given seat diameter, therefore providing a better seal. The configuration of the portion 16 and 17 is, of course, determined by the configuration of the mold. It will be understood that the tip comprising the portion 16 and 17 may be of a convex smoothly curved profile rather than consisting of two conical portions having different apex angles.

In the molding of the rubber tip, it is desirable to eliminate any flash which might occur between the upper end 18 of the metallic needle body and the lower peripheral edge of the portion 16.

As best seen in FIGURE 4, the mold is fragmentarily indicated at 19 having a sprue hole 20 through which the rubber tip material is injected. The lower peripheral edge of the mold cavity engages over and swages the upper peripheral edge 18 of the socket so that no flash can escape and the part after molding is in finished condition.

In FIGURES 3 and 4 I have indicated a modification of the invention wherein the tip 111 is in the form of a simple cone not having a convex or double angled surface. The danger in molding a rubber tip having a simple conical surface is that in shrinking the tip 111 will become concave as shown in FIGURE 6. There are several reasons why the tip 111 would assume the shape of FIGURE 6, but this phenomenon can be overcome in a number of ways.

One way in which the configuration of FIGURE 6 may be avoided with a simple conical tip is shown in FIGURE 7. In FIGURE 5 there is indicated the socket 214 having the threads 215. If the rubber is injected without treating the threads 215, there is a tendency for many rubber compounds to bond to the untreated metal surface. If such bonding occurs, a condition is created wherein all volumetric thermal shrinkage occurs in the exposed tip, as shown in FIGURE 6. To avoid this undesirable result, I coat the interior of the socket 214 and threads 215 with a material indicated at 22. This material is a material which provides a degree of lubricity and non-adhesion between the ruber and metal. It may be in the nature of a parting compound. When such material 22 is used, the polymerized material of the shank 221 may move with respect to the threads 214 and thereby relieve tensions resulting from shrinkage of the rubber during polymerization.

From the foregoing description, it will be understood that the threaded method of attachment of the shank of the rubber tip to the socket of the metallic body may be used regardless of the configuration of the tip portion of the valve element. If a simple conical tip is provided, the shrinkage problem may be overcome as described in connection with FIGURE 7. With the convex or doubled angled tip slight distortions resulting from shrinkage do not have harmful effects.

It will be understood that when hereinafter I refer to the rubber tip I intend to include natural and synthetic rubbers of various kinds. It is only necessary that the material of the tip not be deleteriously affected by the material passing through the valve.

It will be understood that various modifications may be made without departing from the spirit of the invention. I therefore do not intend to limit myself otherwise than as set forth in the claims which follow:

Having now fully described the invention, what I claim as new and desire to secure by Letters Patent is:

1. A method of making a composite substantially conical valve element having a rigid body and an undistorted resilient tip, the body and tip configuration being such as to provide for minimal turbulence and flow restriction in use, which method comprises the steps of providing a rigid body having a socket, placing said body in contact with the inner surface of a mold for said resilient tip, causing the mold to engage said body so as to swage the exterior periphery of the body in the region of the socket into what will be an uninterrupted continuation of the configuration of the tip to be formed, and then injecting resilient material into said mold to fill said socket and to form said tip, whereby the body constitutes an uninterrupted continuation of the configuration of the tip and whereby no substantial amount of the injected resilient material can escape between the mold and body to form any material amount of flash which would require removal.

2. The method of claim 1 including the step of providing a tip holding means in said socket.

3. The method of claim 2 in which said tip holding means comprises internal threads.

4. The method of claim 2 including the step of coating said socket and said tip holding means with a material providing for non-adhesion between said resilient material and said body, whereby said resilient material is prevented from bonding to said body to thus relieve tensions resulting from shrinkage of said resilient material during thermal contraction; the relationship between said material, which provides for the non-adhesion, and the said tip holding means being such that said tip will continue to be held in said socket by said tip holding means after the thermal contraction has taken place.

5. A method of making a metallic rubber tipped needle valve element, which includes the steps of providing a metallic needle valve body having an internally threaded socket, placing said body in contact with the inner surface of a mold for a rubber tip, causing the exterior periphery of said body in the region of said socket to be swaged by said mold, and then injecting rubber into said mold to fill said socket, threads and mold cavity, whereby the injected rubber cannot escape between the mold and valve body to form a flash which would require removal.

6. A method of making a metallic ruber tipped needle valve element, which includes the steps of providing a metallic needle valve body having an internally threaded socket, providing on the threads in said socket a film of a material providing for lubricity and non-adhesion between said ruber and metal, placing said body in contact with the inner surface of a mold for a rubber tip, causing the exterior periphery of said body in the region of said socket to be swaged by said mold, and then injecting rubber into said mold to fill said socket, threads and mold cavity, whereby the injected rubber cannot escape between the mold and valve body to form a flash which would require removal, and whereby said rubber is prevented by said film from bonding to said body to thus relieve tensions resulting from shrinkage of said rubber during thermal contraction, the relationship between said film and said threads being such that said rubber will continue to be held in said socket by said threads after the thermal contraction has taken place.

References Cited in the file of this patent

UNITED STATES PATENTS

| | | |
|---|---|---|
| 1,589,913 | Wells | June 22, 1926 |
| 2,011,007 | May | Aug. 13, 1935 |
| 2,414,577 | Adair et al. | Jan. 21, 1947 |
| 2,761,349 | Heller | Sept. 4, 1956 |
| 2,771,091 | Baker et al. | Nov. 20, 1956 |
| 2,801,150 | Koryta | July 30, 1957 |